United States Patent
Barnes et al.

(10) Patent No.: US 7,617,851 B2
(45) Date of Patent: Nov. 17, 2009

(54) REFUELING VAPOR RECOVERY SYSTEM

(75) Inventors: Timothy J. Barnes, Caro, MI (US);
Wallace J. Booms, Fraser, MI (US);
Steven R. Hilderley, LaSalle (CA);
Jeffrey L. Yager, Windsor (CA)

(73) Assignee: TI Group Automotive Systems, L.L.C., Warren, MI (US)

( * ) Notice: Subject to any disclaimer, the term of this patent is extended or adjusted under 35 U.S.C. 154(b) by 948 days.

(21) Appl. No.: 10/857,690

(22) Filed: May 28, 2004

(65) Prior Publication Data

US 2006/0118202 A1    Jun. 8, 2006

(51) Int. Cl.
*B65B 3/04* (2006.01)
(52) U.S. Cl. .................. 141/286; 137/588; 137/601.18; 220/86.2
(58) Field of Classification Search .................. 141/348, 141/59, 285, 286, 350; 137/587, 588, 601.18; 220/86.2; 123/516, 517
See application file for complete search history.

(56) References Cited

U.S. PATENT DOCUMENTS

| | | | | |
|---|---|---|---|---|
| 3,907,153 | A * | 9/1975 | Mutty | 220/86.2 |
| 4,044,913 | A * | 8/1977 | Brunnert | 220/86.2 |
| 4,441,533 | A * | 4/1984 | Snyder et al. | 141/59 |
| 4,651,889 | A * | 3/1987 | Uranishi et al. | 220/86.2 |
| 4,702,386 | A * | 10/1987 | Boehmer et al. | 220/86.2 |
| 4,722,454 | A * | 2/1988 | Fischer | 220/746 |
| 4,826,511 | A * | 5/1989 | Harris | 96/156 |
| 4,874,020 | A | 10/1989 | Bucci | |

(Continued)

FOREIGN PATENT DOCUMENTS

EP    0 223 931    6/1987

(Continued)

*Primary Examiner*—Stephen Hepperle
*Assistant Examiner*—William McCalister
(74) *Attorney, Agent, or Firm*—Reising Ethington P.C.

(57) ABSTRACT

A fuel vapor recovery system of a vehicle has a fill pipe inlet assembly located at a distal end of a fuel tank fill pipe. The inlet assembly has a cylindrical wall defining an elongated cavity divided axially into upstream and downstream regions by a restrictor plate which carries a hole for close receipt of a fuel supply nozzle of a remote fuel pump. During refueling of the tank, fuel vapor flows from the tank via a recirculation tube and into the inlet cavity of the fill pipe to become entrained into the flowing liquid fuel as oppose to being released to atmosphere. The fuel vapor enters the upstream region at an aperture carried by the wall disposed immediately upstream from the restrictor plate and downstream from a hood. The hood limits vapor release to atmosphere and draws the vapor downstream through a port carried by the restrictor plate for entrainment of vapor into the liquid fuel in the downstream region. Toward the end of the refueling process, any fuel welling or backing up within the fill pipe is generally limited to the downstream region of the cavity via the restrictor plate and an automatic shutoff feature of the remote fuel pump. Liquid fuel is thus less likely to enter the recirculation tube in the upstream region even if the automatic shut-off feature of the remote refuel pump should fail. Consequently, it is less likely that liquid fuel will flow into the canister of the vapor recovery system even when the automatic shut-off feature of the remote refuel pump has failed.

16 Claims, 3 Drawing Sheets

U.S. PATENT DOCUMENTS

| | | | |
|---|---|---|---|
| 4,887,652 A | 12/1989 | Bucci | |
| 4,934,417 A | 6/1990 | Bucci | |
| 4,966,299 A | 10/1990 | Teets et al. | |
| 5,033,517 A | 7/1991 | Bucci | |
| 5,131,439 A | 7/1992 | Bucci | |
| 5,215,110 A | 6/1993 | Benjey | |
| 5,375,633 A | 12/1994 | Bucci | |
| 5,431,144 A * | 7/1995 | Hyodo et al. | 123/520 |
| 5,606,954 A | 3/1997 | Yamazaki et al. | |
| 5,769,057 A * | 6/1998 | Hashimoto et al. | 123/516 |
| 5,960,817 A | 10/1999 | Johansen et al. | |
| 5,960,839 A * | 10/1999 | Armesto et al. | 141/304 |
| 5,975,154 A | 11/1999 | Bennett | |
| 5,983,963 A | 11/1999 | Pozgainer et al. | |
| 6,065,507 A | 5/2000 | Nanaji | |
| 6,170,535 B1 * | 1/2001 | Sadr et al. | 138/137 |
| 6,170,538 B1 * | 1/2001 | Devall | 141/59 |
| 6,415,827 B1 * | 7/2002 | Harris et al. | 141/348 |
| 6,648,033 B2 | 11/2003 | Gabbey et al. | |
| 2005/0161095 A1 * | 7/2005 | Banerjee et al. | 137/588 |

FOREIGN PATENT DOCUMENTS

JP      60-199731      10/1985

* cited by examiner

REFUELING VAPOR RECOVERY SYSTEM

FIELD OF THE INVENTION

The present invention relates to a vehicle fuel system and more particularly to a refueling vapor recovery system.

BACKGROUND OF THE INVENTION

On-going environmental concerns have resulted in increasingly stringent government regulations placed upon the automotive industry. One area of concern is the release of volatile hydrocarbon fuel vapors during refueling of a vehicle. A conventional vapor recovery system is described in U.S. Pat. No. 5,960,817, filed Nov. 3, 1997, and is incorporated herein by reference. When filling a fuel tank with volatile hydrocarbon fuel (or even diesel fuel), the air and fuel vapor in the tank is in-part filtered and displaced to atmosphere. Fuel vapor is removed from the displaced air before release to atmosphere by a fuel vapor storage canister that contains activated charcoal for absorbing the hydrocarbon vapors flowing from the fuel tank and later generally releasing the vapors to an intake manifold of an operating engine.

Other government regulations, directed toward emissions and fuel consumption, tend to persuade automotive manufacturers to produce lighter and smaller vehicles thus increasing fuel economy. Ideally, size and weight of every component, including the fuel vapor storage canister is addressed. Thus, the advantages of a larger and heavier canister to satisfy vapor regulations and prolong the operating life of a canister, can be outweighed by a smaller and lighter canister to satisfy fuel economy regulations and possibly reduce manufacturing costs provided, when necessary, alternative measures are taken to meet fuel vapor release regulations.

Because the useful operating life of a vapor storage canister is predicated on the amount and rate of vapor it must absorb during refueling, redirecting some of the fuel vapor otherwise exposed to the canister is one measure to prolong the life and reduce the necessary size and weight of a fuel vapor storage canister while still meeting government regulations. One such technique is a recirculation tube which communicates between the inlet side of the canister and a fill pipe that receives incoming liquid fuel from a remote fuel supply pump of a refueling station. The recirculation tube redirects a portion of the outgoing fuel vapor from the fuel tank during refueling of the tank and entrains the vapor into the incoming liquid fuel flowing within the fill pipe. To entrain the vapor into the liquid fuel and prevent release to atmosphere, the outlet aperture of the recirculation tube is located immediately downstream of a fill pipe restrictor plate designed to minimize splash-back of fuel and vapor release to atmosphere. The restrictor plate carries a hole sized to closely receive the fuel supply nozzle of the remote refueling pump.

Unfortunately, because the outlet aperture is located below the restrictor plate it is dependent upon the automatic shutoff feature of the remote fuel supply pump to prevent liquid fuel from entering the recirculation tube through the aperture. If the shutoff feature of the nozzle or remote fuel pump is not sufficiently responsive, or should the feature fail altogether, fuel backing up into the fill pipe can cause liquid fuel to enter the recirculation tube. The reverse flow of liquid fuel through the recirculation tube from the outlet aperture can degrade the vapor recovery system by potentially flooding the carbon canister and destroying the carbon bed.

SUMMARY OF THE INVENTION

A fuel vapor recovery system of a vehicle has a fill pipe inlet assembly located at a distal end of a fuel tank fill pipe. The inlet assembly has a cylindrical wall defining an elongated cavity divided axially into upstream and downstream regions by a restrictor plate which carries a hole for close receipt of a fuel supply nozzle of a remote fuel pump. During refueling of the tank, fuel vapor flows from the tank via a recirculation tube and into the inlet cavity of the fill pipe to become entrained into the flowing liquid fuel as opposed to being released to atmosphere. The fuel vapor enters the upstream region at an aperture carried by the wall disposed immediately upstream from the restrictor plate and downstream from a hood. The hood limits vapor release to atmosphere and draws the vapor downstream through a port carried by the restrictor plate for entrainment of vapor into the liquid fuel in the downstream region. Toward the end of the refueling process, any fuel welling or backing up within the fill pipe is generally limited to the downstream region of the cavity via the restrictor plate and an automatic shutoff feature of the remote fuel pump. Liquid fuel is thus less likely to enter the recirculation tube in the upstream region even if the automatic shut-off feature of the remote refueling pump should fail. Consequently, it is less likely that liquid fuel will flow into the canister of the vapor recovery system even when the automatic shut-off feature of the remote refueling pump has failed.

Objects feature and advantages of this invention include providing a vapor recovery system that is resistant to carbon canister flooding, prolongs canister life, permits reduced canister size and manufacturing cost, reduces vapor release to atmosphere, is a relatively simple, robust and inexpensive design with no maintenance and an overall prolonged useful life.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENT

Figure 1:
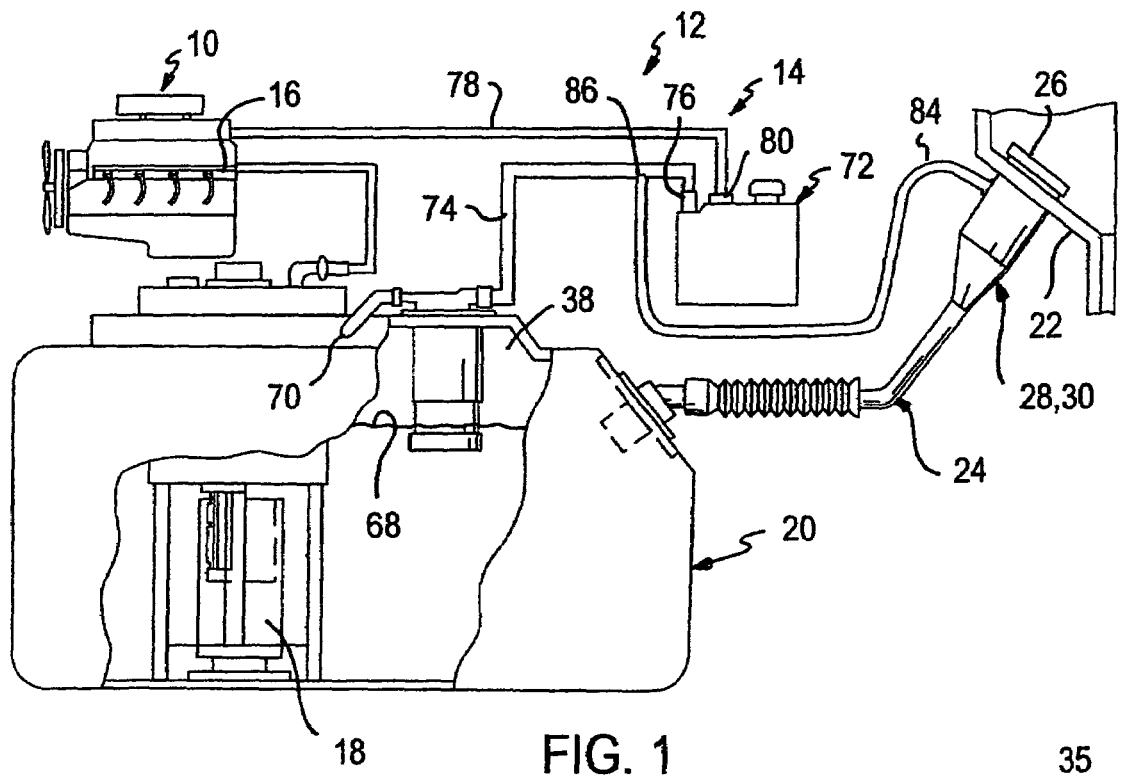
FIG. 1 is a semi-diagrammatic view of a vehicle fuel system with a fuel tank having a fill pipe, fuel pump module, vapor storage canister, and a vapor recovery system embodying this invention.

Referring in more detail to the drawings, FIG. 1 illustrates a combustion engine 10 of a vehicle serviced by a fuel system 12 having a vapor recovery system 14 of the present invention. Conventionally, a fuel rail 16 of the engine 10 receives pressurized liquid fuel from a fuel pump 18 submerged in liquid fuel contained by an on-board fuel tank 20. A downward sloped fuel fill pipe 24, through which liquid fuel is added to the tank 20, connects between an exterior body panel 22 of the vehicle and the fuel tank 20.

Figure 2:
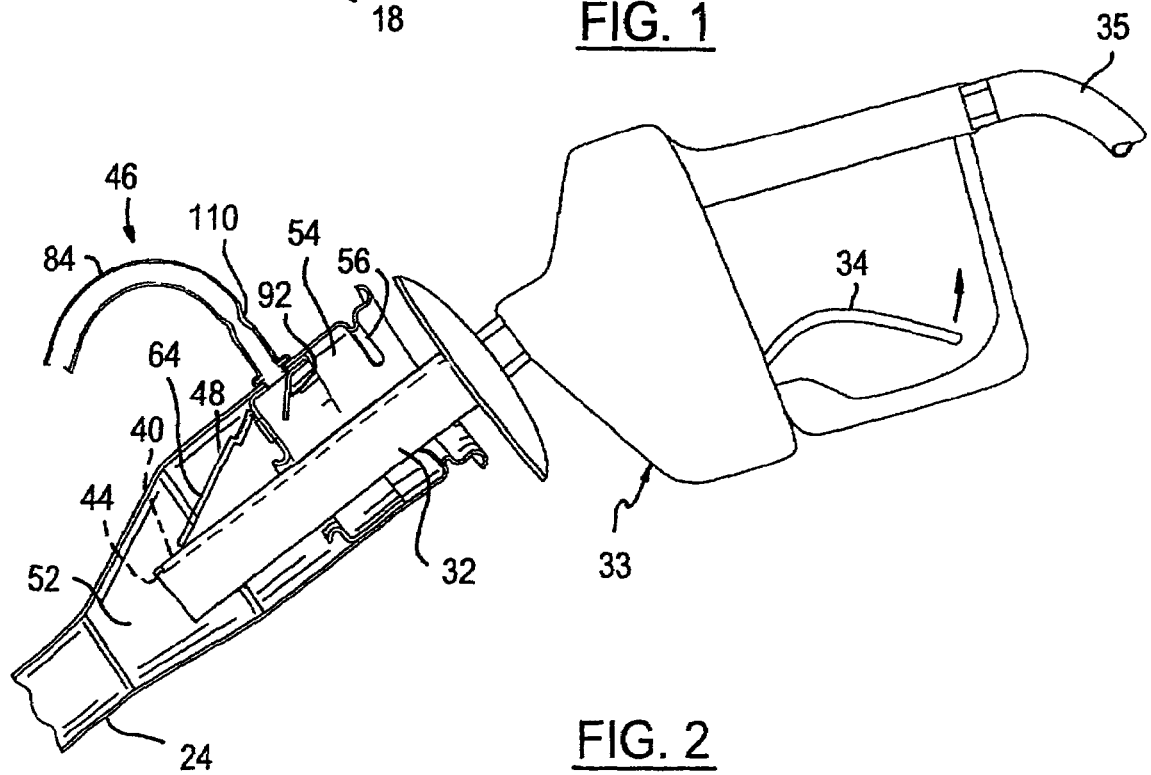
FIG. 2 is a partial side sectional view of a fill pipe inlet assembly of the vapor recovery system illustrating an inserted refueling pump nozzle.

When refueling the tank 20, the engine 10 is preferably shut down and a sealable and removable gas cap 26 is removed from the open end 30 of the fill pipe 24 received adjacent to the body panel 22. As best illustrated in FIG. 2, during refueling, a refueling pump nozzle 32 projecting from a trigger handle 33 and connected to a remote fuel pump (not illustrated) of a refueling station via a supply hose 35, is inserted into the distal end 30 of the fill pipe 24 and upon manual actuation of a lever 34, liquid fuel flows from the nozzle 32 through the fill pipe 24, and into the fuel tank 20. When the fuel tank 20 is generally full, the remote fuel pump will automatically shut-off, such as by way of an automatic shut-off feature carried by the refueling nozzle 32.

Ideally, the remote fuel pump will continue flowing fuel through the nozzle 32 until the tank 20 is approximately ninety-five to ninety-seven percent full creating a vapor dome 38 having a volume of only three to five percent of the total tank volume. With typical fuel tanks ranging from fifteen to twenty gallons and fuel supply flows ranging from four to ten gallons per minute, an automatic shut-off feature of the remote fuel pump must be quick acting and thus highly sensitive to pressure at the nozzle 32 during refueling. To sense pressure for automatic shut-off, the nozzle 32 has a small axially extending internal tube 40 communicating with a diaphragm-type pressure sensor internal to the trigger handle 33 at one end and having a pressure port 44 located substantially near the end of the nozzle 32 at an opposite distal end. Upon experiencing a vacuum signal, created when the pressure port 44 is immersed in liquid fuel, the pressure sensor will automatically shut off the fuel pump indicating the tank 20 is full.

To immerse the port 44 in liquid fuel, there exists a brief and limited welling up or back flow of liquid fuel within the fuel pipe 24 when the tank is deemed full. The timing of the back flow is dictated in part by the flow characteristics of the fill pipe 24 which is effected in-part by its diameter, slope and bends. Once the desired back flow in the fill pipe occurs, the shut-off feature of the fuel supply pump must react quickly to shut off the fuel supply and stop any continued back flow of fuel which could otherwise flood the vapor dome 38 and fill pipe 24, and possibly cause fuel overflow outside of the vehicle. Such "welling-out" of the fill pipe 24, sometimes called "spit-back," is generally undesirable and currently restricted by government regulations.

A fill pipe inlet assembly 46 of the vapor recovery system 14 has a cup-like member or restrictor plate 48 which in-part controls the desired fuel welling and restricts fuel spit-back. The restrictor plate 48 traverses an axially elongated and radially enlarged inlet cavity 50 of the fill pipe 24 defined by the side wall 28 at the inlet end 30. The restrictor plate axially divides the cavity 50 into a substantially conical shaped downstream region 52 for funneling fuel and creating a dynamic seal during filling and a cylindrical shaped upstream region 54 which carries threads 56 for securing the gas cap 26. The desired fuel welling or back flow is restricted to the downstream region 52 which briefly becomes a high pressure zone, and the upstream region is generally exposed to atmosphere when the gas cap 26 is removed.

Figure 3:
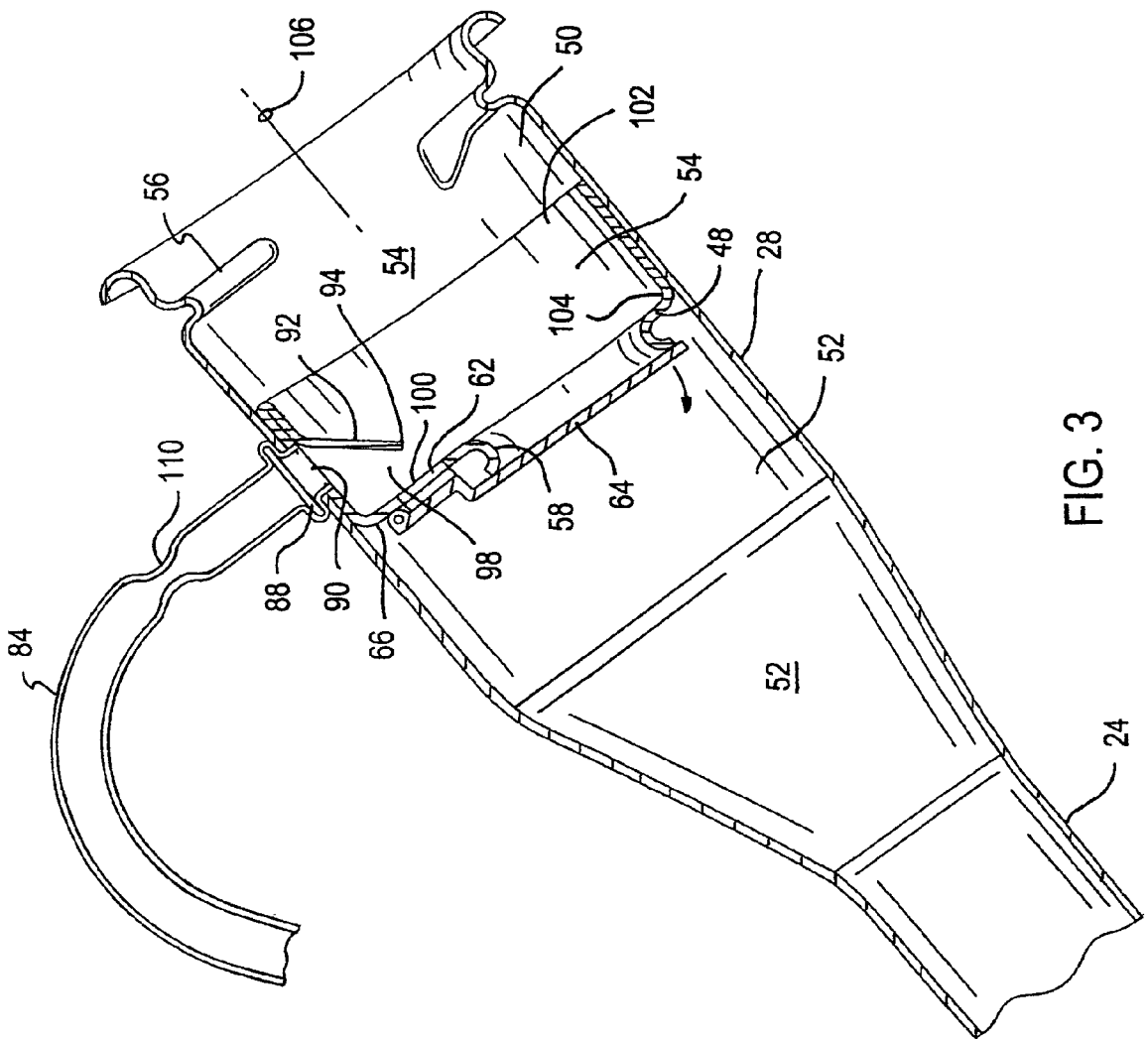
FIG. 3 is an enlarged fragmentary cross sectional view of the fill pipe inlet assembly without the fuel pump nozzle.
Figure 4:
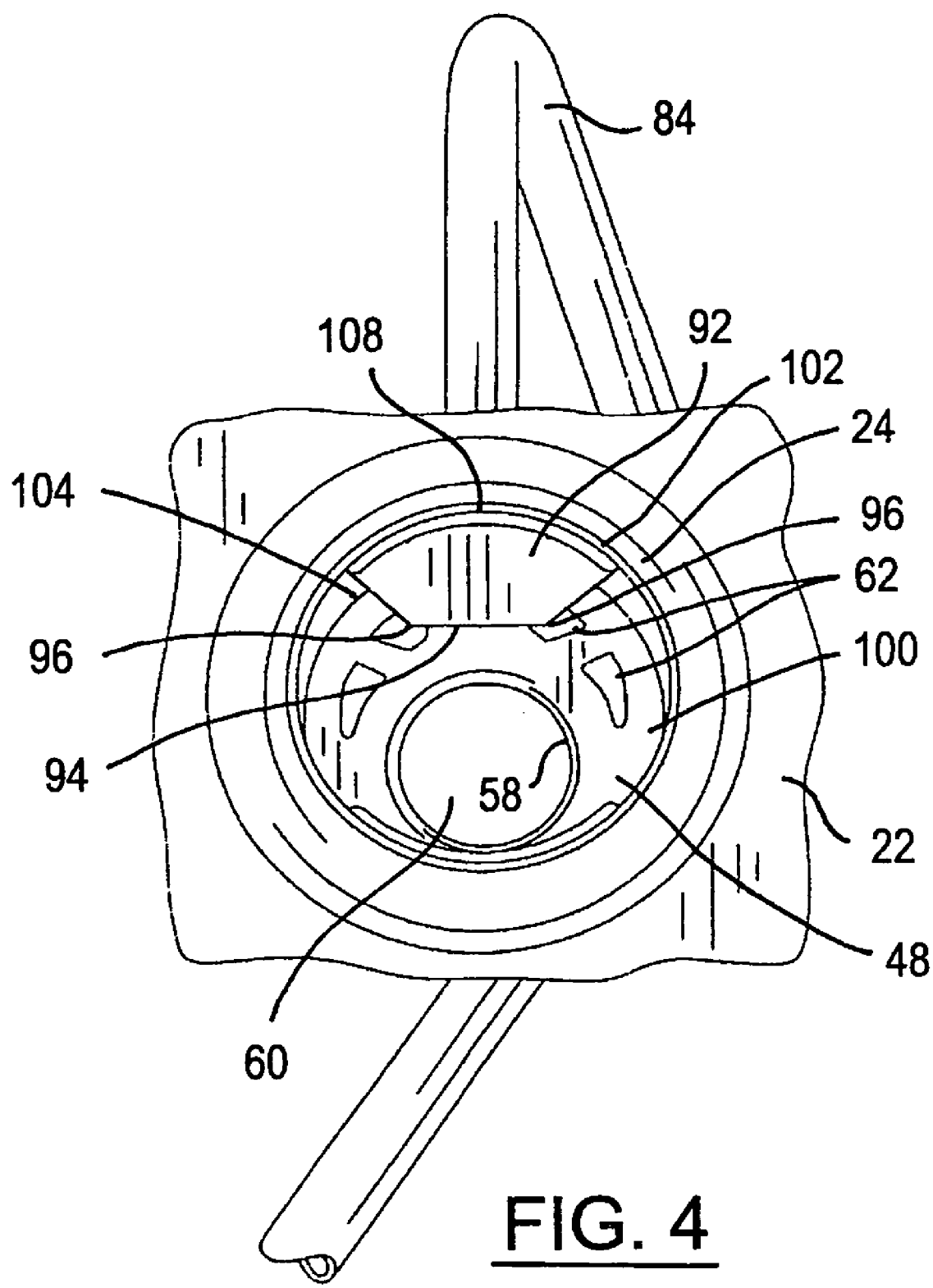
FIG. 4 is a top perspective view of a restrictor plate of the fill pipe inlet assembly.

Referring to FIGS. 3 and 4, the restrictor plate 48 carries an inner rim 58 defining a hole 60 for close receipt of the nozzle 32 which projects into the downstream region 52 when refueling, and four smaller orifices 62 which permit the fill pipe 24 to breath, thus in-part inducing a dynamic seal limiting turbulent fuel flow through the fill pipe 24 and reducing the chance of pre-mature refueling pump shut-off due to excessive backflow or welling of liquid fuel within the pipe. Preferably, the diameter of the hole 60 is only slightly larger than the outside diameter of the fuel nozzle 32 which is sized according to the fuel type being pumped. For instance, a diesel fuel nozzle is larger than a gasoline nozzle. Inadvertent refueling of a gasoline tank with diesel fuel is prevented since a diesel nozzle would not fit into a restrictor plate hole for a gasoline tank.

The restrictor plate 48 also prevents the accumulation and discharge of static electricity potentially generated by the flow of fuel through the hose of the refueling pump and fill pipe 24 of the vehicle. To guard against static electricity, the metallic nozzle is grounded electrically to the pipe 24 via a normally biased closed metallic flapper 64, preferably hinged or connected pivotally to a bottom surface 66 of the restrictor plate 48. Insertion of the nozzle 32 into the hole 60 pushes or pivots the metallic flapper 64 away from the rim 58. The flapper 64 is biased directly the metal of the nozzle 32 and urges the nozzle against the inner rim 58 of the restrictor plate 48, thus providing two points of electrical contact for grounding of the nozzle to the restrictor plate which is grounded to the chassis of the vehicle.

The orifices 62 of the restrictor plate 48 generally provide breathing for the fill pipe 24 and generally not for the fuel tank 20. Hence, with continued refueling, a liquid fuel surface 68 in the tank 20 rises and the vapor dome 38 above the surface decreases in volume. Air and vapor, therefore, exit the tank 20 through an independent vent port 70, as opposed to the fill pipe 24 which would otherwise disturb fuel flow and possibly cause fuel to well-up in the fill pipe 24 leading to pre-mature shutoff of the refueling pump nozzle 32 or fuel spit-back and vapor release outside of the vehicle. Because government regulations limit the amount of hydrocarbon vapor that can be released to atmosphere, the air exiting the tank 20 during the refueling process must be filtered and/or a substantial portion of the vapor exiting the tank must be temporarily stored.

The fuel vapor recovery system 14 of the present invention has a vapor storage canister 72 preferably containing a bed of charcoal (not shown) for filtering the air and absorbing hydrocarbon fuel vapors at near atmospheric pressure. A vapor supply line or tube 74 routes generally from the vent port 70 of the fuel tank 20 to an inlet 76 of the canister 72. After the refueling operation and during running of the engine, hydrocarbon vapors absorbed in the charcoal bed of the canister 72 are released and flow through a discharge line or tube 78 connected to an outlet 80 of the canister, and into the intake manifold 16 which is generally at sub-atmospheric pressure.

Sizing of the supply line 74, the vapor storage canister 72 and the discharge line 78 are dependent upon a wide variety of factors. For instance, applications requiring an extended useful life of a vapor storage canister 72 require larger canisters with larger charcoal beds. Similarly, larger fuel tanks 20 or applications requiring higher fill pipe flow rates require larger canisters so that the useful life is not diminished. Yet further, the diameter of the vapor supply and discharge lines 74, 78, or the insertion of line orifices 82, must be sufficiently sized so as not to impede fuel flow through the fill pipe 24, and yet small enough to prevent over-exposure of the canister 72 and possibly the fuel tank 20 to the vacuum pressure of the intake manifold 16.

To prolong the useful life of the canister 72 and/or enable the use of smaller, lighter and less costly vapor storage canisters, a recirculation line or tube 84 redirects a small percentage of the tank's exiting vapor flow from the supply line 74, upstream of the canister, and into the fill pipe 24 for vapor entrainment into the incoming liquid fuel flow from the nozzle 32. Preferably, the recirculation tube 84 flows approximately ten percent of the total vapor flow exiting the tank 20 and connects to the supply line 74 via a T-connection 86 substantially near the inlet 76 of the canister 72. The opposite end of the recirculation line 84 preferably press fits or forms to a nipple 88 projecting radially outward from the fill pipe wall 28 and which communicates with or generally defines an aperture 90 disposed upstream of the restrictor plate or cup-shaped member 48. Because the aperture 90 is located upstream of the restrictor plate 48 instead of downstream, any fuel-welling or brief backflow of liquid fuel within the fill pipe 24, possibly caused by a failure in the automatic shut-off feature of the fuel pump, is confined substantially below the restrictor plate 48 and is thus far less likely to backflow into the recirculation tube 84 which would flood and degrade operation of the vapor recovery system 14.

During refueling, vapor flowing through the recirculation tube 84 and into the upstream region 54 of the fuel pipe inlet cavity 50 is redirected through the restrictor plate orifices 62 via a sloping awning or hood 92 projecting radially inward from the wall 28 and located axially upstream of the restrictor plate 48. As the hood 92 projects radially inward, it also extends axially downstream to a distal edge 94 having opposite ends 96 spaced approximately one hundred and twenty degrees or less apart from one another with respect to the fill pipe wall 28 and dictated by the spacing and dynamics of the restrictor plate orifices 62. A slot 98 is defined between an upward surface 100 of the restrictor plate 48 and the edge 94 of the hood 92 which acts much like a venturi to direct the vapor from the aperture 90 and through the orifices 62 below the hood 92 to entrain the vapor into the liquid fuel flow.

Preferably, the hood 92 is unitarily formed from a collar 102 projecting axially upstream from a periphery 104 of the restrictor plate 48 forming the cup-like member shape. During the manufacturing, the hood 92 is preferably cut and stamped out of the collar 102 and bent radially inward at an angle as previously described. The collar 102, hood 92, restrictor plate 48 and flapper 64 are then press fitted into the distal inlet end 30 of the fill pipe 24 and aligned circumferentially so that the aperture 90 is centered beneath the hood 92.

In most vehicle applications, the fill pipe 24 and corresponding elongated inlet cavity 50 slope downward to the fuel tank. The restrictor plate 48, however, remains substantially perpendicular to a center axis 106 of the continuous wall 28. This creates an elevational high point or twelve o'clock position 108 along the periphery 104 of the restrictor plate 48. Depending upon the refueling characteristics of the fuel system 12, the aperture 90, hood 92 and orifices 62 may vary from the twelve o-clock position 108, but preferably by no more than forty-five degrees in either circumferential direction with respect to the wall 28.

As best illustrated in FIG. 3, the vapor recovery system 14 is most vulnerable to fuel flooding in a scenario where the automatic shut-off feature of the refueling nozzle 32 and pump fails. The vapor recovery system 14 can be further guarded against such failure by the addition of a restricting orifice 110 in the recirculation tube 84. The restricting orifice 110 acts to provide a more convoluted path for liquid fuel flow thus minimizing any amount of fuel which can flow into the vapor storage canister 72.

As best illustrated in FIGS. 2 and 3, the continuous wall 28 defining the downstream region 52 is substantially funnel-shaped for creating a dynamic seal of liquid fuel. Preferably, the wall 28 and fill pipe 24 are shaped and positioned to create a substantially solid column of flowing fuel within the fill pipe 24. Although this column of liquid fuel is not completely laminar (i.e. vapor entrainment), it does prevent vapor release to atmosphere from the tank 20 and through the fill pipe 24.

While the form of the invention herein disclosed constitutes a presently preferred embodiment, many others are possible. It is not intended herein to mention all the equivalent forms or ramifications of the invention. It is also understood that the terms used herein are merely descriptive rather than limiting and that various changes may be made without departing from the spirit or scope of the invention.

We claim:

1. A fuel vapor recovery system for a fuel tank of a vehicle utilized when refueling the vehicle from a remote refueling pump having a refueling nozzle, the fuel vapor recovery system comprising:

a vapor storage canister with an inlet communicating with a vapor dome in the fuel tank to receive fuel vapor from the tank when refueling the fuel tank;

a fuel fill pipe having an inlet adjacent one end and an outlet distal from the inlet and communicating with the fuel tank, and having an inlet cavity adjacent the one end of the fill pipe, open to the exterior of the fill pipe to enable receipt of a refueling nozzle, and defined by a continuous wall and an aperture communicating through the continuous wall;

a restrictor plate engaged circumferentially to the continuous wall in the inlet cavity and downstream of the aperture, the restrictor plate having a hole through the restrictor plate sized for close receipt of the refueling nozzle;

the continuous wall of the fill pipe having a generally conically shaped region downstream of the restrictor plate and adjacent the fuel outlet of the refueling nozzle when received in the fill pipe for funneling liquid fuel and creating a dynamic liquid seal during refueling;

a breathing orifice through the restrictor plate and separate and spaced from the hole for receipt of the refueling nozzle, the aperture being upstream of the restrictor plate and the breathing orifice; and a vapor recirculation tube communicating between the vapor dome in the fuel tank and the inlet cavity via the aperture upstream of the restrictor plate and the breathing orifice so that a portion of the fuel vapor in the fuel tank is routed through the recirculation tube and the aperture and flows in a downstream direction through the breathing orifice and is entrained into the liquid fuel flowing through the outlet of the fill pipe during refueling.

2. The fuel vapor recovery system set forth in claim 1 comprising a hood projecting radially inward from the continuous wall adjacent and immediately upstream of the breathing orifice and over the aperture.

3. The fuel vapor recovery system set forth in claim 2 wherein the hood is spaced axially away from the restrictor plate defining a slot between the hood and restrictor plate, wherein the slot produces a venturi effect upon fluid flow through the slot.

4. The fuel vapor recovery system set forth in claim 1 comprising:

the vapor storage canister having a vapor outlet that is communicated with an intake manifold of an engine;

a vapor supply line communicating between the vapor dome in the fuel tank and the vapor inlet of the vapor storage canister; and wherein the recirculation tube communicates with the fuel tank via the vapor supply line.

5. The fuel vapor recovery system set forth in claim 4 comprising a restricting orifice in the recirculation tube.

6. The fuel vapor recovery system set forth in claim 3 comprising:
the vapor storage canister having a vapor outlet;
a vapor supply line communicating between the fuel tank and the vapor inlet of the vapor storage canister; and
wherein the recirculation tube communicates with the vapor dome of the fuel tank via the vapor supply line.

7. The fuel vapor recovery system set forth in claim 6 comprising a vapor discharge line communicating between the vapor outlet and an intake manifold of a combustion engine.

8. A fill pipe inlet assembly of a vehicle for controlling release of fuel vapors to the atmosphere when refueling a fuel tank with an outlet for communicating the inlet of a vapor storage canister with a vapor dome in the fuel tank during refueling via a fill pipe integrated with the fill pipe inlet assembly adjacent an inlet end of the fill pipe, the fill pipe inlet assembly comprising:
a continuous wall defining an elongated cavity adjacent the inlet end of the fill pipe and having an upstream region and a downstream region;
a restrictor plate located in the cavity between the upstream and downstream regions and engaged to the continuous wall, the restrictor plate having a hole through the restrictor plate sized for close receipt of a refueling supply nozzle of a remote refueling pump which extends through the upstream region and projects into the downstream region during refueling and an orifice through the restrictor plate and separate and spaced from the hole;
the continuous wall of the fill pipe having a generally conically shaped region downstream of the restrictor plate and adjacent the fuel outlet of a refueling nozzle when received in the fill pipe for funneling liquid fuel and creating a dynamic liquid seal during refueling;
a hood spaced axially upstream of the restrictor plate in the upstream region and projecting radially inward to substantially cover the orifice;
an aperture through the continuous wall and in the upstream region between the hood and the restrictor plate; and
a vapor recirculation tube communicating between a vapor dome of the fuel tank and through the aperture the upstream region between the hood and the restrictor plate so that the fuel vapor flowing through the aperture from the recirculation tube flows in a downstream direction within the upstream region through the orifice and is entrained into the liquid fuel flowing in the downstream region of the elongated cavity of the fill pipe during refueling.

9. The fill pipe inlet assembly set forth in claim 8 comprising:
a radially outward periphery of the restrictor plate;
a cylindrical collar projecting upstream from the periphery and including an opening through the collar and aligned with the aperture; and
wherein the hood is unitary to the collar.

10. The fill pipe inlet assembly set forth in claim 9 comprising:
an axis of the elongated cavity sloping downward;
wherein the restrictor plate is perpendicular to the axis;
the aperture communicating with the recirculation tube and through the continuous wall; and
an elevational high point of the periphery of the restrictor plate being circumferentially aligned to the aperture and the hood.

11. The fill pipe inlet assembly set forth in claim 9 wherein the collar press fits to the continuous wall.

12. The fill pipe inlet assembly set forth in claim 8 comprising a biased closed flapper disposed in the downstream region and covering the hole.

13. The fill pipe inlet assembly set forth in claim 12 wherein the flapper pivots resiliently open when the nozzle is inserted through the hole.

14. The fill pipe inlet assembly set forth in claim 13 wherein the flapper is metallic and is constructed and arranged to be grounded electrically to a chassis of the vehicle, and wherein the flapper is in electrical contact with the nozzle during refueling.

15. The fill pipe inlet assembly set forth in claim 8 wherein the orifice is smaller than the hole.

16. The fill pipe inlet assembly set forth in claim 8 wherein the conically shaped region of the continuous wall is in the downstream region in which a refueling nozzle is received to provide the dynamic liquid seal during refueling.

* * * * *

UNITED STATES PATENT AND TRADEMARK OFFICE
CERTIFICATE OF CORRECTION

PATENT NO. : 7,617,851 B2
APPLICATION NO. : 10/857690
DATED : November 17, 2009
INVENTOR(S) : Barnes et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1252 days.

Signed and Sealed this

Fourteenth Day of December, 2010

David J. Kappos
*Director of the United States Patent and Trademark Office*